United States Patent [19]
Makita

[11] Patent Number: 5,285,357
[45] Date of Patent: Feb. 8, 1994

[54] SEALING CAP FOR VEHICLE HEADLAMPS AND METHOD OF FABRICATION

[75] Inventor: Hiroyuki Makita, Shimizu, Japan

[73] Assignee: Koito Manufacturing Co., Ltd., Tokyo, Japan

[21] Appl. No.: 898,971

[22] Filed: Jun. 15, 1992

[51] Int. Cl.⁵ .................. F21M 3/00; F21V 31/02
[52] U.S. Cl. ..................... 362/61; 362/267
[58] Field of Search ............ 362/61, 66, 80, 267, 362/310, 457

[56] References Cited

U.S. PATENT DOCUMENTS

| | | | |
|---|---|---|---|
| 4,569,006 | 2/1986 | Bergin et al. | 362/267 |
| 4,623,958 | 11/1986 | Van Der Linde et al. | 362/267 |
| 5,032,964 | 7/1991 | Endo et al. | 362/66 |
| 5,067,056 | 11/1991 | Suzuki et al. | 362/66 |
| 5,172,972 | 12/1992 | Terao | 362/310 |

FOREIGN PATENT DOCUMENTS

1415714  11/1975  United Kingdom .
2031576  4/1980  United Kingdom .

*Primary Examiner*—Richard R. Cole
*Attorney, Agent, or Firm*—Sughure, Mion, Zinn, Macpeak & Seas

[57] ABSTRACT

A sealing cap for watertightly closing an access opening in the lamp housing of an aimable vehicle headlamp having a bulb tiltably mounted therein. The sealing cap comprises a relatively rigid framing part and a relatively pliant cap part closely interengaged into an essentially single unit. The framing part has a core of annular shape, and a plurality of hooks formed in one piece with the core and coacting therewith to engage the edge of the lamp housing bounding the access opening. The cap part is generally disklike in shape, comprising an outer sheath of annular shape enveloping the core of the framing part, a central bulb holder of tubular shape to be sleeved upon the base of the bulb, and an intermediate flexible connective portion of annular shape joining the sheath and the bulb holder.

8 Claims, 8 Drawing Sheets

SEALING CAP FOR VEHICLE HEADLAMPS AND METHOD OF FABRICATION

BACKGROUND OF THE INVENTION

This invention relates to vehicle headlamps in general and, in particular, to a sealing cap for vehicle headlamps and to a method of fabricating the sealing cap.

An aimable headlamp is known which comprises a lamp housing immovably mounted to a vehicle body, a reflector tiltably mounted to the lamp housing, and an electric bulb replaceably mounted to the reflector. The reflector together with the bulb is tilted relative to the reflector for aiming the beam of light thrown by the headlamp. The lamp housing has a relatively large access opening for electrical connection of the lamp bulb to a power supply and for replacement of the bulb. A disklike sealing cap is generally employed for watertightly closing the annular gap between the lamp housing edge defining the access opening and the base of the bulb.

One known sealing cap is a substantially disklike piece of rubber or like elastic material comprising a peripheral portion with an annular groove to engage a rim which is formed on the lamp housing so as to surround the access opening, a tubular central portion to fit over the base of a lamp bulb, and an annular, pleated intermediate portion joining the peripheral portion and the central portion.

An objection to this prior art device is that, in remounting the sealing cap as after bulb replacement, the groove in the peripheral portion may not properly engage the rim of the lamp housing. The peripheral portion must of necessity be of considerable thickness in order to prevent accidental detachment from the lamp housing. A touch on this thick peripheral portion was therefore insufficient to make sure that its groove was in full engagement with the lamp housing rim. Any incomplete engagement led to a failure in watertightly closing the gap between lamp housing and lamp bulb.

This weakness is absent from another known sealing cap which has an annular peripheral portion of L shaped cross section to engage the lamp housing rim. This second known sealing cap is intended for use with a separate disklike locking cap to fit over the sealing cap. The locking cap has an annular peripheral groove to engage the lamp housing rim together with the peripheral portion of the sealing cap and hence to lock the sealing cap in position on the lamp housing.

Once the locking cap is mounted in place, the sealing cap infallibly makes watertight engagement with the lamp housing. However, the necessity for manipulation of both sealing cap and locking cap made bulb replacement troublesome. Also, being engaged with the lamp housing via the elastic sealing cap, the locking cap required considerable manual effort for its mounting and dismounting. Although the locking cap had ribs formed on its periphery to prevent slipping, they were insufficient to afford a firm grip on the cap.

The two prior art devices discussed above are subject to an additional inconvenience in common. Both presuppose the existence of the annular rim on the lamp housing. This rim necessitated the use of sliding molds for the fabrication of the lamp housing. Such molds were complex and expensive in construction.

SUMMARY OF THE INVENTION

The present invention provides an improved sealing cap that overcomes all the above listed inconveniences encountered heretofore, as well as a method of making the improved sealing cap.

Briefly, the invention may be summarized as a sealing cap for an aimable vehicle headlamp of the type having a lamp housing with an access opening formed therein, and a bulb having a base and tiltably mounted within the lamp housing. The sealing cap comprises a framing part of a relatively rigid material, and a cap part of a relatively pliant or elastic material. The framing part has a core of annular shape with hook means formed in one piece therewith for engaging the edge of the lamp housing bounding the access opening. Generally disklike in shape, the cap part has a radially outer sheath of annular shape enveloping the core of the framing part, a central bulb holder of tubular shape to be sleeved upon the base of the bulb, and an intermediate flexible connective portion joining the sheath and the bulb holder.

The framing part of the sealing cap serves mainly as means for mounting the sealing cap to the lamp housing. This framing part is rigid enough to make it readily apparent whether the sealing cap is correctly engaged with the lamp housing, precluding the danger that the sealing cap is left incompletely mounted. The cap part, on the other hand, makes direct contact with both lamp housing and bulb base. Being pliant and elastic, the cap part can make watertight contact with the lamp housing and bulb base.

Although the sealing cap is constituted of two parts as above, they are closely interengaged into an essentially single unit, not separable from each other unless they are broken. The sealing cap is therefore much easier of handling than the noted prior art device having a locking cap in addition to a sealing cap. The manipulation of the sealing cap will become even easier by providing knob means formed in one piece with the framing part.

As an additional advantage, the sealing cap according to the invention requires no undercut on the part of the lamp housing. The lamp housing is therefore easier of molding than the lamp housings for use with the prior art devices.

The sealing cap of the above summarized construction can be easily manufactured by an insert molding method disclosed herein.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
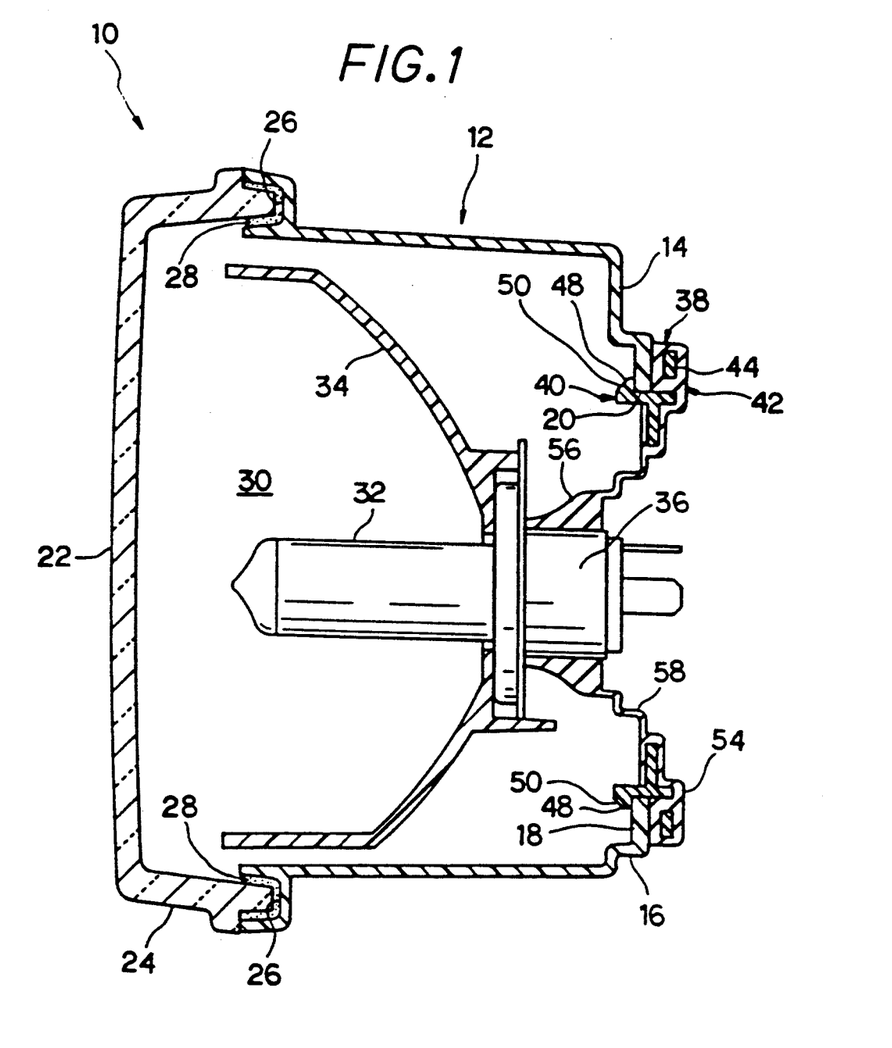
FIG. 1 is a vertical section through an example of aimable vehicle headlamp incorporating the sealing cap of the present invention.
Figure 2:
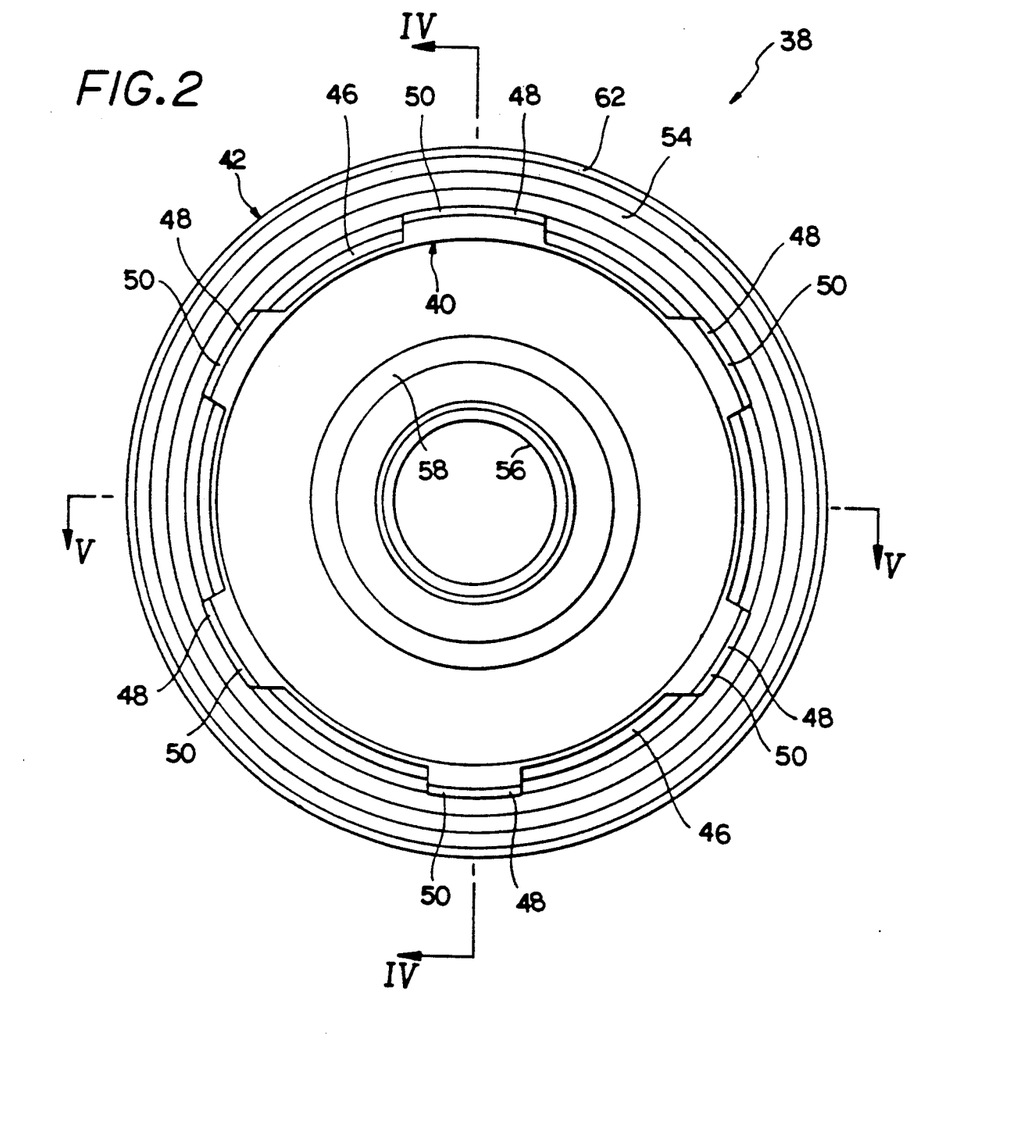
FIG. 2 is an enlarged front elevation of the sealing cap in the headlamp of FIG. 1.
Figure 3:
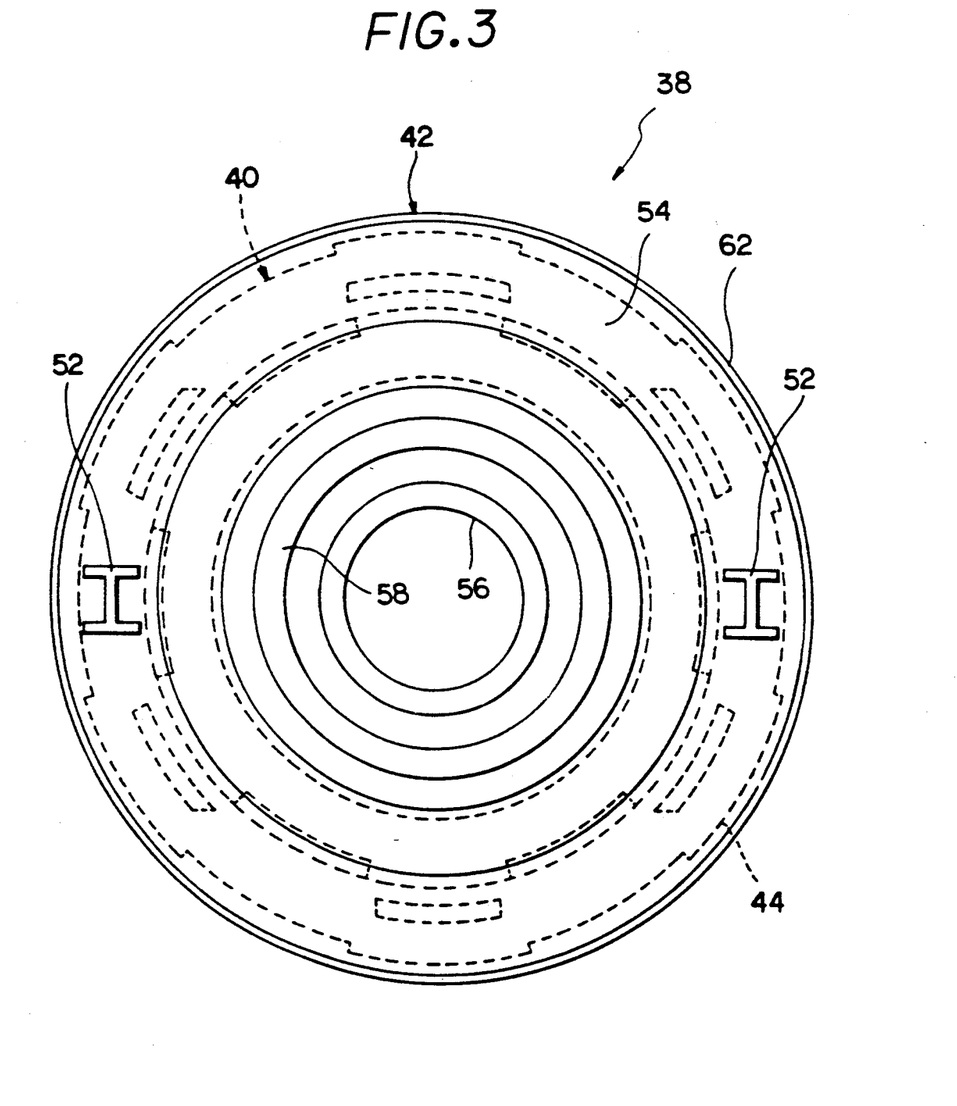
FIG. 3 is an enlarged rear elevation of the sealing cap.

The present invention will now be described in detail as embodied in the aimable vehicle headlamp illustrated in FIG. 1 and therein generally designated 10. The headlamp 10 has a lamp housing 12 molded from a plastic generally into the form of a box with an open front side which is shown directed to the left in FIG. 1. The lamp housing 12 has a rear wall 14, opposite to the open front side, with a tubular rearward projection 16 of relatively short extent. The rearward projection 16 has an inturned rim 18 of annular shape bounding an access opening 20 situated approximately centrally of the lamp housing rear wall 14. The inturned rim 18 is made thicker than the other parts of the lamp housing 12 as the sealing cap according to the invention is to be mounted to the lamp housing by engaging this rim, as will be detailed presently.

Closing the open front side of the lamp housing 12 is a lens 22 of vitreous or transparent plastic material. The lens 22 is formed to include an annular rim 24 turned rearwardly from its periphery. The lens rim 24 is engaged in an annular groove 26 in the front edges of the lamp housing 12 and held fast therein as by an adhesive 28. The lamp housing 12 and the lens 22 define in combination a lighting chamber 30 for accommodating an electric lighting bulb 32 and a reflector 34.

The bulb 32 is mounted centrally to the reflector 34, with a bulb base 36 projecting rearwardly therefrom. The reflector 34 is mounted to the lamp housing 12 for tilting motion about both vertical and horizontal axes. The manner of mounting the bulb 32 to the reflector 34, and that of mounting the reflector to the lamp housing 12, can both be conventional and form no essential features of this invention, so that no more detailed description is deemed necessary.

The reference numeral 38 generally denotes a sealing cap constructed in accordance with the present invention. As better illustrated in FIGS. 2-5, the sealing cap 38 broadly comprises a framing part 40 and a cap part 42 of two different materials closely interengaged into an essentially unitary entity.

Figure 4:
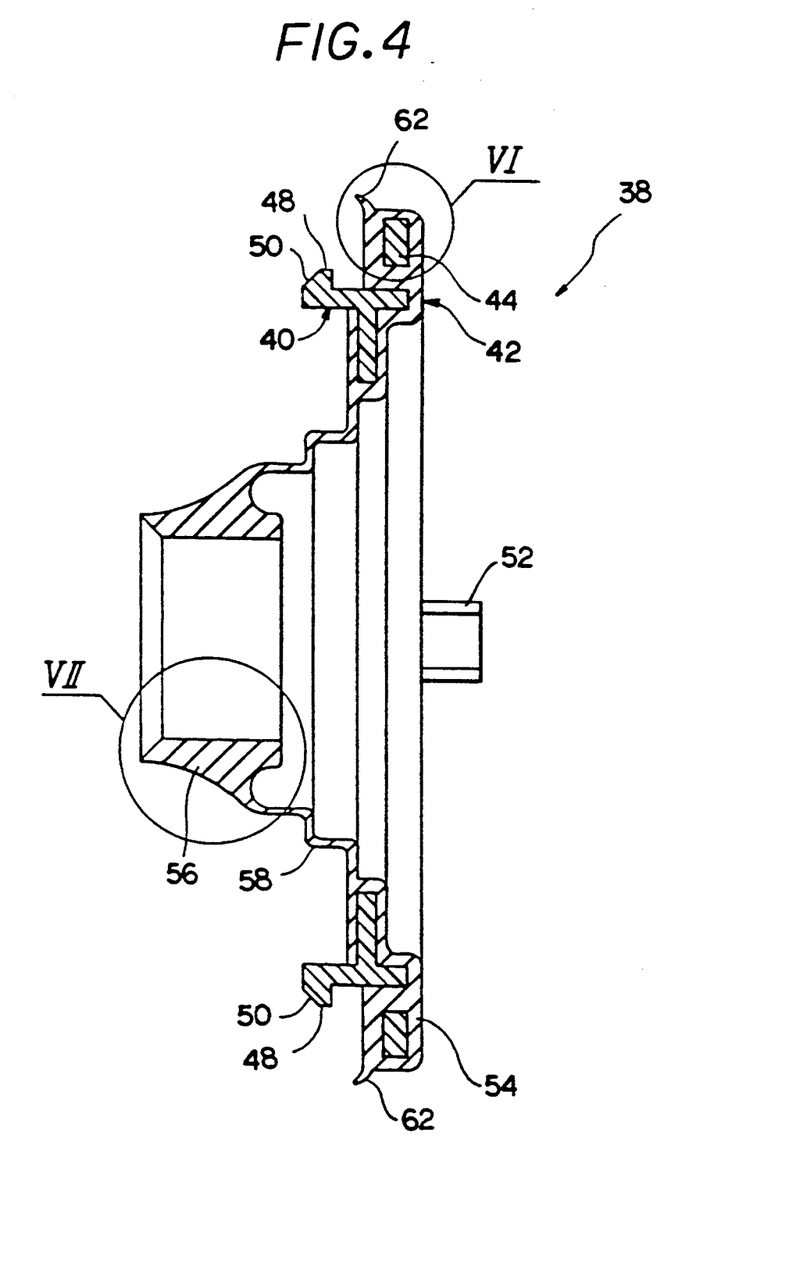
FIG. 4 is a still more enlarged section through the sealing cap, taken along the line IV—IV in FIG. 2.
Figure 5:
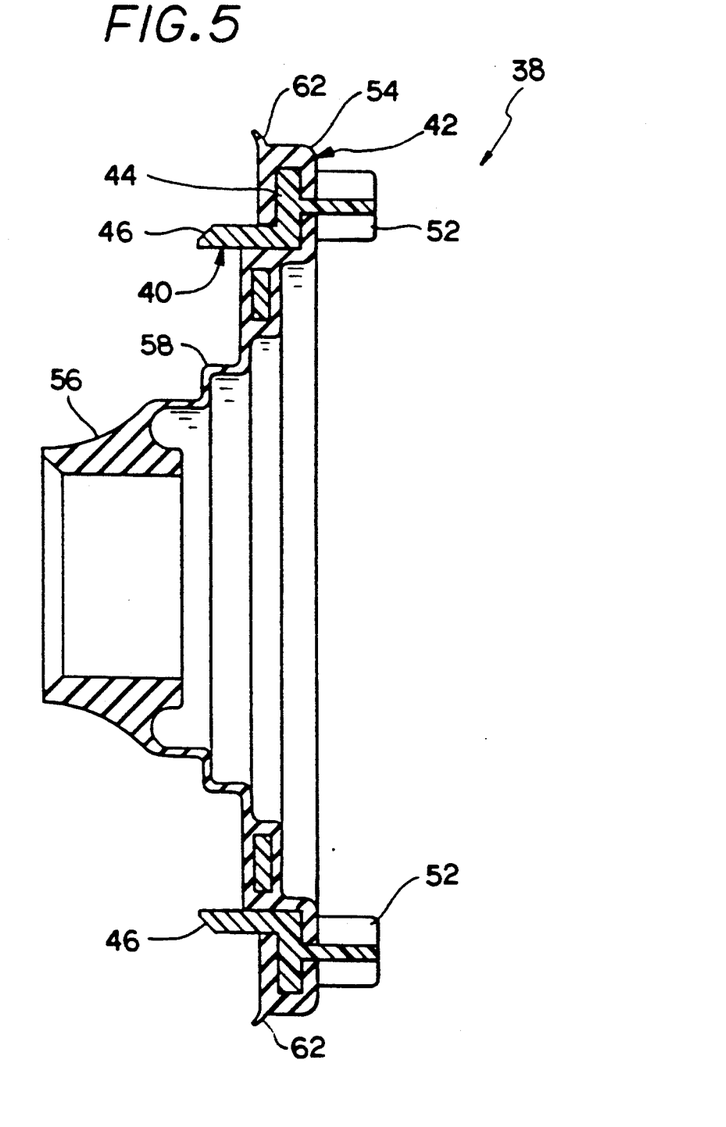
FIG. 5 is another section through the sealing cap, taken along the line V—V in FIG. 2.

As best revealed by FIGS. 4 and 5, the framing part 40 of the sealing cap 38 includes a core 44 in the form of an annular band. Formed in one piece with the core 44 in an intermediate position with respect to its radial or width direction is an annular rim 46 extending forwardly therefrom for insertion in the access opening 20 in the lamp housing 12, as illustrated in FIG. 1. The rim 46 has formed on its front end a plurality of circumferentially spaced hooks 48 for engaging the thick interned rim 18 of the lamp housing 12 in coaction with the core 44. Each hook 48 has a surface 50 which slopes toward the center of the sealing cap 38 or of the access opening 20 as it extends forwardly.

Figure 9:
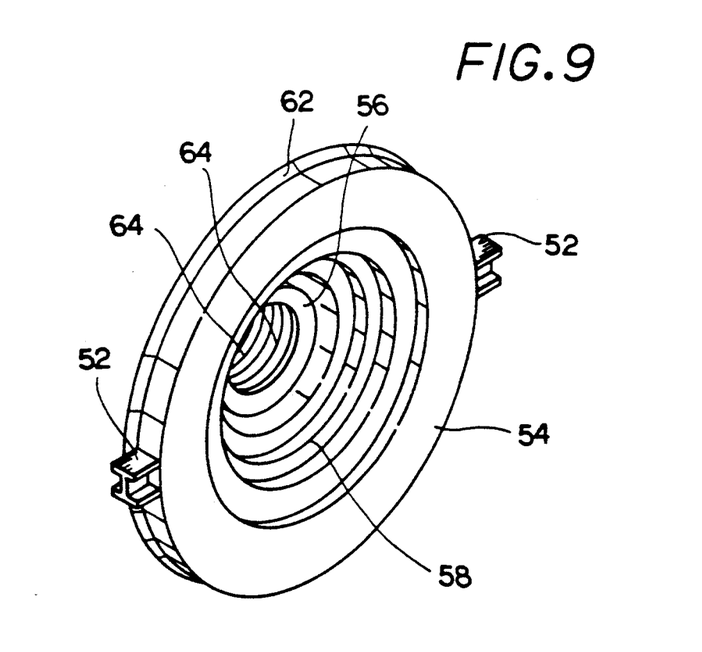
FIG. 9 is a perspective view of a slight modification of the sealing cap.

Also formed in one piece with the core 44 are a pair of diametrically opposed knobs 52 projecting rearwardly therefrom. Each knob is shown to be H shaped as seen in a rear view as in FIG. 3. Alternatively, as illustrated in FIG. 9, such knobs could so formed on the core 44 as to project radially outwardly therefrom. Any desired number of such knobs of any suitable shape and size may in practice be formed in one piece with the core 44 with a view to the ease of mounting and dismounting the sealing cap 38.

Relatively rigid synthetic resins are recommended as a material for the framing part 40, a one piece construction of the components listed above, of the sealing cap 38. Phenolic resin is an example.

The cap part 42 of the sealing cap 38 is also a one piece construction of a sheath 54, a bulb holder 56 and a flexible connective portion 58. Annular in shape, the sheath 54 envelopes the core 44 of the framing part 40, with the rim 46, hook 48 and knobs 54 projecting outwardly of the sheath.

Figure 6:
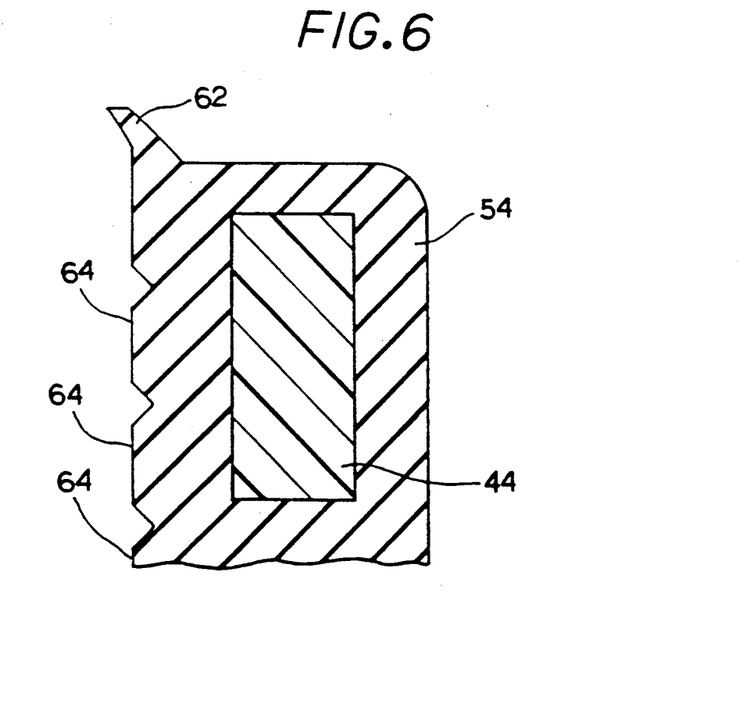
FIG. 6 is an even more enlarged, fragmentary sectional view showing in more detail that part of the sealing cap which is shown enclosed in a circle and designated VI in FIG. 4.

As illustrated on an enlarged scale in FIG. 6, the sheath 54 has a plurality of ribs 60 formed thereon for more watertight contact with the lamp housing 12. Also, a thin, deformable annular fin 62 extends radially from the sheath 54 for still more watertight contact of the sheath 54 with the lamp housing 12.

Figure 7:
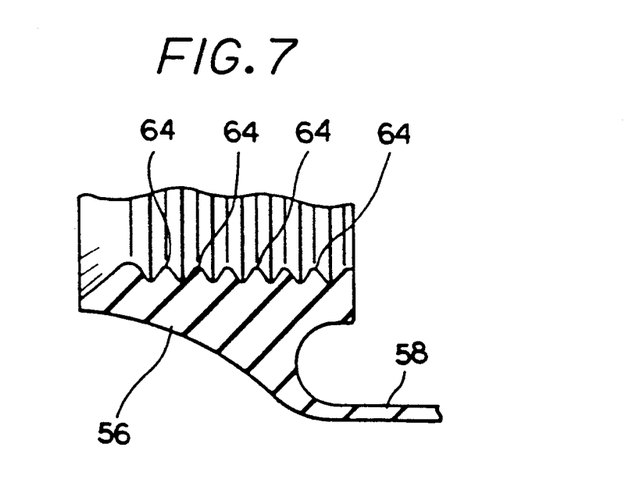
FIG. 7 is a similar view showing in more detail that part of the sealing cap which is shown enclosed in a circle and designated VII in FIG. 4.
Figure 8:
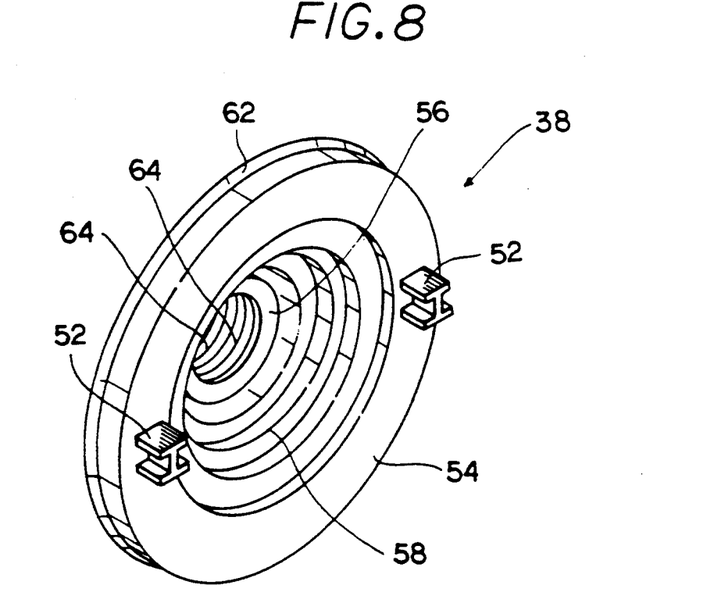
FIG. 8 is a perspective view of the sealing cap.

The bulb holder 56 is tubular in shape to fit closely over the base 36 of the bulb 32. As illustrated on an enlarged scale in FIG. 7, the tubular bulb holder 56 has a plurality of ribs 64 formed on its inside surface for watertight contact with the bulb base 36.

The flexible connective portion 58 is annular in shape and serves to join the sheath 54 and the bulb holder 56. The connective portion 58 is shown pleated for its desired flexibility, permitting the tilting of the bulb 32 together with the reflector 34 in any direction relative to the lamp housing 12.

The cap part 42 should be molded from a material more pliant or elastic than that of the framing part 40. A preferred example is ethylene propylene terpolymer.

Figure 10:
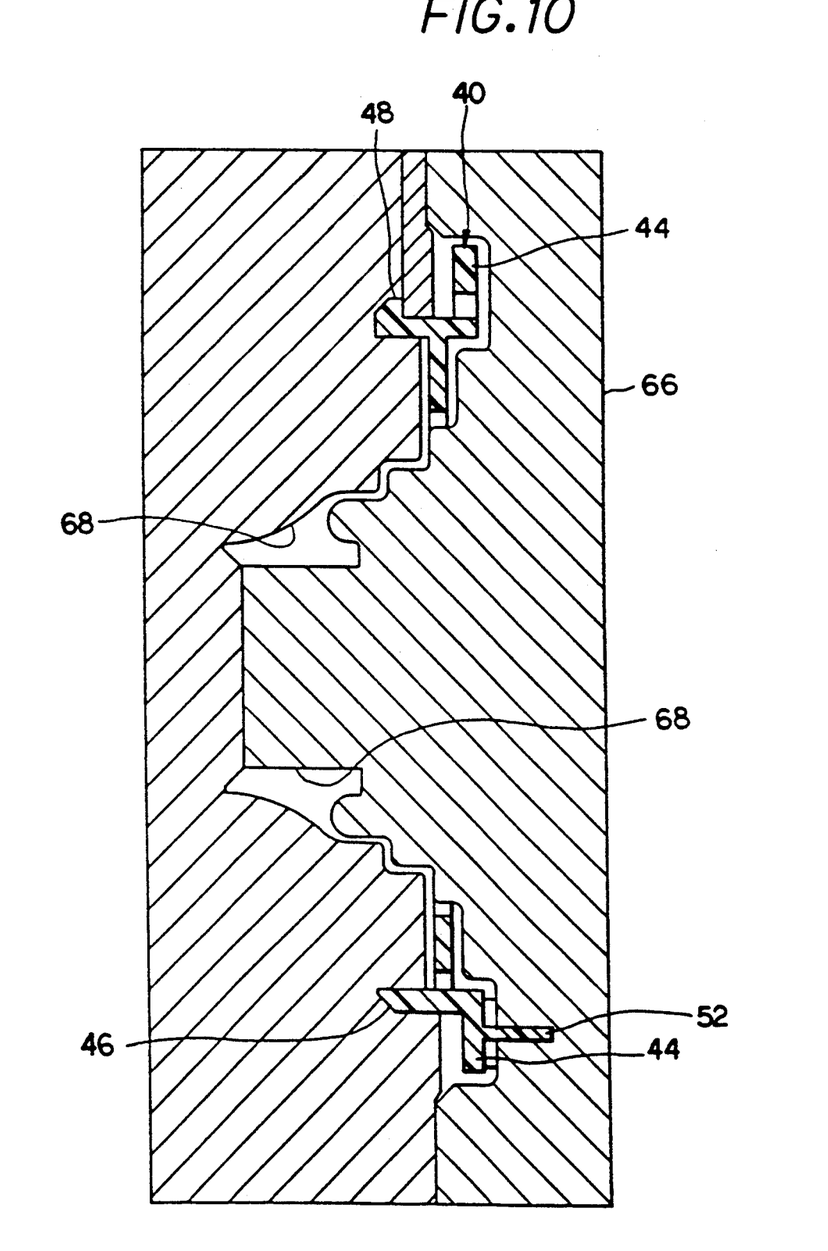
FIG. 10 is a sectional view explanatory of a method of fabricating the sealing cap.

FIG. 10 is explanatory of a method of fabricating the sealing cap 38 of the foregoing construction. The framing part 40 may first be molded conventionally. Then the molded framing part may be placed in a split mold 66 defining a cavity 68 in the shape of the cap part 42. It will be noted from FIG. 10 that only the core 44 of the framing part 40 is loosely received in the mold cavity 68, with the rim 46, hooks 48 and knobs 52 closely received in additional spaces formed in the mold 66. Then the desired material for the cap part 42 may be introduced into the die cavity 68 thereby molding the cap part enveloping the core 44 of the framing part 40.

The sealing cap 38 can be readily fabricated by this insert molding method. The pliant cap part 42 may envelope not only the core 44 but also the knobs 52.

For mounting the sealing cap 38 the bulb holder 56 of the cap part 42 may first be fitted over the base of the bulb 32, it being understood that the bulb has already been mounted to the reflector 34. The bulb holder 56 with its internal ribs 64 will firmly and watertightly grip the bulb base 36.

Then, with the sloping surfaces 50 of the hooks 48 on the rim 46 of the framing part 40 held against the edge of the lamp housing rim 18, the sealing cap 38 may be pushed into the lamp housing 12. Although the framing part 40 is fabricated from a material more rigid than that of the cap part 42, it is nevertheless elastic enough to permit the hooks 48 to deflect radially inwardly of the sealing cap 38 as the sheath 54 of the cap part 42 come into abutment against the outside surface of the lamp housing rim 18. Then the sealing cap 38 may be pushed further into the lamp housing 12, thereby causing elastic deformation of the sheath 54, whereupon the hooks 48 will travel past the edge of the lamp housing rim 18 and spring back to positively engage the same.

The mounting of the sealing cap 38 has now been completed. The sealing cap 38 has watertightly closed the access opening 20 in the lamp housing 12 as its sheath 54, with the ribs 64 and annular rim 62, is pressed against the lamp housing, and as its internally ribbed bulb holder 56 firmly grips the bulb base 36.

It will also be appreciated that the core 44 of the framing part 40 of rigid material, which engages the lamp housing rim 18, is enveloped in the cap part 42 of elastic material. The elastic cap part 42 serves not only to improve the sealing capability of the sealing cap 38 but also to make it readily apparent whether the framing part has positively engaged the lamp housing rim 18. There is accordingly little or no likelihood of the sealing cap being left incompletely mounted to the lamp housing 12.

As an additional advantage, the lamp housing 12 needs no undercutting for mounting the sealing cap 38. The lamp housing is therefore far easier of molding than heretofore.

Despite the foregoing detailed disclosure, it is not desired that the present invention be limited by the exact details of the illustrated embodiments. A variety of modifications, alterations or adaptions of the embodiments may be resorted to in order to conform to design preferences or to the requirements of each specific application of the invention, without departure from the scope of the following claims.

What is claimed is:

1. A sealing cap for an aimable vehicle headlamp of the type having a lamp housing with an access opening formed therein, and a bulb having a base and tiltably mounted within the lamp housing, the sealing cap comprising:
   (A) a framing part comprising:
      (a) a core of annular shape; and
      (b) hook means formed in one piece with the core and coacting therewith to engage an edge of the lamp housing bounding the access opening; and
   (B) a cap part comprising:
      (a) a sheath of annular shape enveloping the core of the framing part
      (b) a bulb holder of tubular shape to be sleeved upon the base of the bulb; and
      (c) a flexible connective portion of annular shape integrally joining the sheath and the bulb holder;
   (C) the framing part being made from a material more rigid than a material from which the cap part is made.

2. The sealing cap of claim 1 wherein the hook means of the framing part comprises:
   (a) a rim of annular shape to be inserted in the access opening in the lamp housing; and
   (b) a plurality of hooks formed in circumferentially spaced positions on the rim.

3. The sealing cap of claim 2 wherein each hook of the hook means has a sloping surface for sliding contact with the lamp housing edge bounding the access opening during the insertion of the rim therein, the sloping surfaces of the hooks causing the hooks to deflect radially inwardly of the access opening during the insertion of the rim therein and, upon full insertion of the rim in the access opening, to spring back into engagement with the lamp housing edge.

4. The sealing cap of claim 1 wherein the sheath of the cap part has a deformable fin of annular shape projecting radially therefrom for watertight contact with the lamp housing.

5. The sealing cap of claim 1 wherein the sheath of the cap part has a plurality of ribs formed thereon for watertight contact with the lamp housing.

6. The sealing cap of claim 1 wherein the bulb holder of the cap part has a plurality of ribs formed on its inside surface for watertight contact with the base of the bulb.

7. The sealing cap of claim 1 wherein the framing part further comprises knob means projecting from the core.

8. A method of making a sealing cap constructed as claimed in claim 1, which method comprises:
   (a) molding the framing part from one material;
   (b) preparing a mold defining a cavity in the shape of the cap part;
   (c) placing the molded framing part in the cavity of the mold; and
   (d) introducing another material into the mold cavity for molding the cap part enveloping the core of the framing part.

* * * * *